Patented June 27, 1939

2,163,609

UNITED STATES PATENT OFFICE 2,163,609

PLASTIC POLYMERIZED CHLOROPRENE ADHESIVE COMPOSITIONS

Alexander D. Macdonald, Malden, Mass., assignor to B. B. Chemical Co., Boston, Mass., a corporation of Massachusetts No Drawing. Application November 22, 1935, Serial No. 51,114

7 Claims. (Cl. 260—32)

This invention relates to liquid adhesive compositions embodying plastic polymerized choloprene and more particularly to such adhesives advantageous for securing together leather and shoe parts.

Plaster polymerized chloroprene is chloroprene (also known as chloro-2-butadiene-1,3) which has been partially polymerized, and is plastic in the sense that it may be worked on the rolls of a rubber mill and compounded with other ingredients in a manner similar to that in which crude rubber is treated. Such plastic polymerized chloroprene may be "cured" or "vulcanized" to a condition in which it is elastic rather than plastic, and in which condition it resembles vulcanized rubber. This "curing" is probably a further polymerization of the partially polymerized chloroprene to a substantially fully polymerized condition rather than the addition of sulphur to the polymer, such as is considered to occur in the vulcanization of rubber.

Objects of the present invention are to provide an improved liquid adhesive composition embodying plastic polymerized chloroprene and possessing particularly advantageous characteristics for securing together parts of leather, especially shoe parts, and to provide an improved method of preparing such adhesive. Another object is to provide a plastic polymerized chloroprene adhesive of such character that not more than one application thereof to the leather or other part is required in order to obtain an adhesive bond of great strength, whereby the labor and other cost of applying the adhesive may be kept at a minimum. A further object is to provide a plastic polymerized chloroprene adhesive which may be used for joining together parts sensitive to high temperatures, and yet which may be vulcanized or cured without injuring such parts.

According to an illustrative embodiment of the invention, the above and other objects are attained by compositions comprising plastic polymerized chloroprene dissolved in a solvent consisting essentially or benzene and trichloroethylene and containing certain definite proportions of plastic polymer and solvent. The composition may, and preferably does, contain compounding and modifying ingredients, and in order to promote curing of the plastic polymer at temperatures in the neighborhood of room temperature, an accelerator may be associated with the composition.

An example of a preferred composition in accordance with this invention is as follows:

| | Grams |
|---|---|
| Plastic polymerized chloroprene (containing 2% phenyl-beta-naphthylamine) | 900 |
| Wood rosin (FF) | 45 |
| Magnesium oxide (light calcined) | 90 |
| Zinc oxide | 45 |
| Phenyl-beta-naphthylamine (stabilizer) | 9 |
| Benzene | 1690 |
| Trichloroethylene | 2850 |
| Sulphur | 27 |
| Du Pont accelerator #808 (butyraldehyde aniline condensation product) | 12 |

It is to be noted that in this example the benzene and the trichloroethylene are present in equal quantities by volume.

In preparing the above composition, the plastic polymer is milled on a rubber mill and the wood rosin, magnesium oxide and zinc oxide are added during the milling, preferably in that order. The resultant milled solid polymer is then cut up into small pieces and is added in a churn to a mixture of the benzene and trichloroethylene. The phenyl-beta-naphthylamine is also added in the churn. When the resulting solution of the milled material in the solvent has become sufficiently viscous to support the sulphur in suspension during the agitation of the solution, the sulphur is introduced into the solution and the agitation thereof is continued until the sulphur has been dispersed or dissolved.

The accelerator preferably is added not more than 24 hours prior to the actual use of the liquid solution for adhesive purposes. It is convenient to withhold a portion of the solvent and to dissolve the accelerator therein, and then to add the accelerator solution to the composition.

In the above composition the plastic polymerized chloroprene is of course the adhesive material. The wood rosin is a softener for the plastic polymer of chloroprene and it assists also in the curing of the polymer. Abietic acid, which is the major constituent of wood rosin, may be substituted for all or a part of the wood rosin end in construing the specification and claims abietic acid-containing materials are to be considered as equivalents of the wood rosin. The magnesium oxide serves to neutralize any hydrochloric acid which may be set free in the polymerized chloroprene, and to prevent scorching when the zinc oxide and plastic polymer of chloroprene are milled together. Light calcined magnesium oxide is preferred because of the generally better results to be obtained therewith. The zinc oxide appears to assist in the curing or more complete polymerization of the plastic polymer of chloroprene. The phenyl-beta-nephthylamine functions as a stabilizer to inhibit premature curing of the polymer. The sulphur assists in the curing or vulcanization of the plastic polymer and appears to contribute to improved properties of the resulting adhesive bond. The accelerator serves to initiate the rapid curing or completion of the polymerization of the plastic polymer at temperatures in the neighborhood of room temperature, and thus making unnecessary heating the parts to be joined, for example shoe parts, to high vulcanizing temperatures. In cases where rapid curing of the polymer is not necessary or desirable, or where it is feasible to employ heat to bring about the cure, the accelerator may be omitted.

In accordance with one of the features of the invention, a liquid adhesive wherein the plastic polymer of chloroprene is dissolved in a solvent comprising approximately equal parts by volume of benzene and trichloroethylene, and wherein the plastic polymer and solvent are present in the approximate proportions of 2 pounds of polymer to a gallon of solvent, may be applied to leather in one coat, will dry within a reasonably short time, and will provide an adhesive bond of great strength. The remarkable efficacy of the adhesion produced by this composition is believed to be due largely to the nature of these solvent materials and to their proportions with respect to each other and to the plastic polymer of chloroprene, whereby a single coat of the adhesive provides secure anchorage to the leather and forms a suitable surface film for adhesive contact with another, and preferably similarly coated, part. The proportions of solvent materials to each other and to the plastic polymer may be satisfactorily varied within certain limits. Thus, while the volume ratio of benzene and trichloroethylene is preferably 1:1, said ratio may satisfactorily vary from 1:2 to 2:1. The concentration of plastic polymerized chloroprene may be varied from about 1½ to about 2¼ pounds of plastic polymer to the gallon of solvent.

Expressing the above proportions and limits in terms of parts by weight, a solvent consisting of equal parts by volume of benzene and trichloroethylene consists approximately of 2 parts by weight of the former and 3 parts by weight of the latter. A preferred composition containing about 2 pounds of plastic polymerized chloroprene to the gallon of the above solvent would comprise in parts by weight about 1 part plastic polymer and 5 parts of the above solvent, or, in other words, about 1 part plastic polymer, 2 parts benzene, and 3 parts trichloroethylene. The proportion of plastic polymerized chloroprene to the above solvent may vary from 1 part plastic polymer and 7 parts solvent to 1 part plastic polymer and 4 parts solvent, corresponding to a concentration of about 1½ to 2¼ pounds plastic polymer per gallon of solvent containing about equal volumes of benzene and trichloroethylene.

Corresponding to a variation in volume ratio of benzene to trichloroethylene of from 1:2 to 2:1, the solvent blend itself may vary from 1 part of benzene and 4 parts of trichloroethylene to 2½ parts of benzene and 2 parts of trichloroethylene. A composition corresponding to 2 pounds of plastic polymerized chloroprene per gallon of solvent of this range of composition would comprise 1 part by weight of plastic polymer, 1 to 2½ parts by weight of benzene, and 4 to 2 parts of trichloroethylene, or, in terms of total solvent, 1 parts by weight of plastic polymer and 5⅓ to 4½ parts of solvent.

A composition wherein the concentration of plastic polymerized chloroprene varied from about 1½ to 2¼ pounds of plastic polymer per gallon of solvent and wherein the solvent blend ratio of benzene and trichloroethylene ranged from 1:2 to 2:1 by volume, would comprise in parts by weight, 1 part of plastic polymerized chloroprene, 1 to 3 parts by weight of benzene, and 5½ to 2 parts of trichloroethylene, or, in terms of total solvent, 1 part plastic polymer and 4 to 7 parts of solvent blend.

In order to obtain optimum results in brushing the adhesive by hand on leather or other material, I have found that the viscosity of the liquid adhesive solution should be within the range of from 15 to 25 seconds, and preferably from 17 to 22 seconds. Where the adhesive is to be applied by extrusion or other mechanical means, the viscosity of the adhesive may be higher, and up to, for example, 50 seconds. This viscosity refers to the number of seconds required for a steel ball of 9.5 millimeters (⅜ inch) diameter and weighing from 3.45 to 3.55 grams to drop 40 centimeters through a sample of the liquid adhesive maintained at 25° C. in a glass tube of 19 millimeters inside diameter. Obviously the viscosity of the composition might be expressed in other units.

Due to variability in the constituent materials of the composition, mode of preparation of the composition, and the like, it sometimes happens that the viscosity of the solution is higher than the above-indicated range. The viscosity may, of course, be lowered by the addition of a relatively large amount of solvent but in such case the concentration of plastic polymer is appreciably lowered, which in many instances is undesirable.

I have found it possible, in accordance with another feature of the invention which is claimed in my divisional application, Serial No. 138,631, filed April 23, 1937, to reduce the viscosity of the composition to a figure within the desired range and without substantially changing the concentration of plastic polymer and the ratio of solids to solvent, by the addition of a relatively small amount of an alcohol. Thus, for example, a cement having a composition similar to that given in the above specific example and having a viscosity of about 30 seconds may be reduced in viscosity to about 20 seconds by the addition of about 30 cubic centimeters of ethyl alcohol to a liter of cement. The alcohol not only effects a reduction in the viscosity of the adhesive, but it also imparts thereto a smooth and free-flowing characteristic, whereby the cement may be more readily spread over a surface to which it is to be applied. The term "alcohol" is used herein in a broad sense and it is to include the following named compounds, all of which have been found efficacious for this purpose: methyl alcohol, ethyl alcohol, iso-propyl alcohol, butyl alcohol, glycerine, meta cresol, beta naphthol, resorcinol, di-acetone alcohol, phenol, butyl carbitol (diethylene glycol mono-butyl ether), butyl cellosolve (ethylene glycol mono-butyl ether), diethylene glycol, methyl cellosolve (ethylene glycol mono-methyl ether). Of the above and other equivalent compositions, ethyl alcohol is at present the preferred alcohol for use in producing the desired viscosity-reducing effect in the adhesive composition.

In reducing the viscosity of the liquid adhesive by means of an alcohol, for example, ethyl alcohol, the alcohol may, if desired, be added directly to the composition, provided that such direct addition be made carefully and in small increments so as not to produce local coagulation of the plastic polymer of chloroprene. However, in order to prevent any possible local coagulation of the plastic polymer and to make it unnecessary to add the alcohol in small increments, it is preferred to add the alcohol mixed with one or more of the solvents employed in the composition, namely, benzene or trichloroethylene. Thus, a mixture of equal volumes of alcohol and benzene or trichloroethylene may be added more freely to the liquid adhesive to produce the desired reduction in viscosity and without danger of local coagulation of the dissolved material.

In carrying out the adhesion of leather or shoe parts by means of the liquid adhesive composition of this invention, the leather parts are preferably first roughed in a suitable manner, such as by an emery wheel or a wire brush, in order to provide surfaces most advantageous for cementing. The liquid adhesive is then applied preferably to both surfaces to be united. The application of the adhesive may be by brush, by extrusion, or in any other suitable manner. The applied composition is then permitted to dry for a sufficient length of time to remove a major portion of the solvent. At the time of the application of the adhesive to the leather the leather may be water-moistened or, as known in the art, in temper. However, where conditions permit, it is desirable, though not necessary, to have the leather in an air-dry condition. Ordinarily a drying time of not more than about one hour is necessary before the adhesive coated parts may be brought together under attaching pressure. On the other hand, the adhesive may be permitted to dry for as much as 8 to 12 hours before bringing the adhesive coated parts together without seriously affecting the strength of bond. After a suitable drying period as described above, the parts are brought together under attaching pressure, either momentarily or for a longer period. By way of example, in the adhesive attaching of shoe parts an attaching pressure of 80 pounds per square inch has been found satisfactory. Lower attaching pressures may be employed but preferably a relatively high attaching pressure is used.

With respect to certain features disclosed herein, namely, the reduction of viscosity of the liquid adhesive by means of an alcohol and the addition of sulphur directly to the solution in order to prevent premature curing of the plastic polymer, such features are not limited to compositions embodying benzene and trichloroethylene but may be employed with other solvents for plastic polymerized chloroprene.

In so far as they are equivalents, this invention is to be construed sufficiently broadly to cover other halogen polymers of butadiene, for example, bromoprene.

Having described my invention, what I claim as new and desire to secure by Letters Patent of the United States is:

1. A liquid adhesive composition for securing together parts of leather or other material, said composition comprising about 1 part by weight of plastic polymerized chloroprene dissolved in from about 4 to about 7 parts by weight of a solvent mixture of benzene and trichloroethylene, said benzene and trichloroethylene being present in said solvent mixture in approximately the following proportions by weight:

| | Parts |
|---|---|
| Benzene | 1 to 3 |
| Trichloroethylene | 5½ to 2 |

2. A liquid adhesive composition for securing together parts of leather or other material, said composition comprising plastic polymerized chloroprene dissolved in a mixture of benzene and trichloroethylene, said ingredients being present in approximately the following proportions by weight:

| | Parts |
|---|---|
| Plastic polymerized chloroprene | 1 |
| Benzene | 1 to 2½ |
| Trichloroethylene | 4 to 2 |

3. A liquid adhesive composition for securing together parts of leather of other material, said composition comprising about 1 part by weight of plastic polymerized chloroprene dissolved in from about 4 to about 7 parts by weight of a solvent mixture of benzene and trichloroethylene, said solvent mixture containing in proportions by weight approximately 2 parts of benzene and 3 parts of trichloroethylene.

4. A liquid adhesive composition for securing together parts of leather or other material, said composition comprising plastic polymerized chloroprene dissolved in a mixture of benzene and trichloroethylene, said ingredients being present in approximately the following proportions by weight:

| | Parts |
|---|---|
| Plastic polymerized chloroprene | 1 |
| Benzene | 2 |
| Trichloroethylene | 3 |

5. A liquid adhesive composition for securing together parts of leather or other material, said composition comprising the following ingredients in approximately the following proportions by weight:

| | Parts |
|---|---|
| Plastic polymerized chloroprene | 900 |
| Wood rosin | 45 |
| Magnesium oxide | 90 |
| Zinc oxide | 45 |
| Benzene | 1100 to 2200 |
| Trichloroethylene | 3700 to 1800 |
| Stabilizer (small amount). | |
| Sulphur | 30 |

6. A liquid adhesive composition for securing together parts of leather or other material, said composition having a viscosity of from 15 to 50 seconds and comprising the following ingredients in approximately the following proportions by weight:

| | Parts |
|---|---|
| Plastic polymerized chloroprene | 900 |
| Wood rosin | 45 |
| Magnesium oxide | 90 |
| Zinc oxide | 45 |
| Benzene | 1100 to 2200 |
| Trichloroethylene | 3700 to 1800 |
| Phenyl-beta-naphthylamine (small amount). | |
| Sulphur | 30 |
| Accelerator (small amount). | |

7. A liquid adhesive composition for securing together parts of leather or other material, said composition having a viscosity of from 15 to 25 seconds and comprising the following ingredients in approximately the following proportions by weight:

| | Parts |
|---|---|
| Plastic polymerized chloroprene | 900 |
| Wood rosin | 45 |
| Magnesium oxide | 90 |
| Zinc oxide | 45 |
| Benzene | 1650 |
| Trichloroethylene | 2800 |
| Stabilizer (small amount). | |
| Sulphur | 30 |

ALEXANDER D. MACDONALD.